United States Patent
Venkatesan et al.

(10) Patent No.: US 9,743,248 B2
(45) Date of Patent: Aug. 22, 2017

(54) SYSTEMS AND METHODS FOR MEDIA SHARING

(71) Applicant: Sony Corporation, Tokyo (JP)

(72) Inventors: Prem Venkatesan, San Diego, CA (US); Ronen Erlich, San Diego, CA (US); Sriram Sampathkumaran, San Diego, CA (US); Takaaki Ota, San Diego, CA (US); Lucas Eberle, Foster City, CA (US); Maximilien Takano, Del Mar, CA (US)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 14/938,747

(22) Filed: Nov. 11, 2015

(65) Prior Publication Data
US 2017/0134905 A1 May 11, 2017

(51) Int. Cl.
*H04W 24/00* (2009.01)
*H04W 4/02* (2009.01)
*H04W 12/06* (2009.01)
*H04W 4/00* (2009.01)

(52) U.S. Cl.
CPC ........... *H04W 4/025* (2013.01); *H04W 4/005* (2013.01); *H04W 4/021* (2013.01); *H04W 12/06* (2013.01)

(58) Field of Classification Search
CPC ..... H04W 4/025; H04W 4/005; H04W 4/021; H04W 12/06; G06F 17/30041; G06F 17/30047; H04N 21/2743
USPC ....................................................... 455/456.2
See application file for complete search history.

(56) References Cited

U.S. PATENT DOCUMENTS

| | | | |
|---|---|---|---|
| 7,970,418 B2 | 6/2011 | Schmidt | |
| 8,311,983 B2 | 11/2012 | Guzik | |
| 8,510,247 B1 | 8/2013 | Kane, Jr. | |
| 2013/0198197 A1 | 8/2013 | Sawhney | |
| 2013/0335582 A1* | 12/2013 | Itasaki | G06F 3/005 348/207.1 |
| 2014/0067955 A1 | 3/2014 | Christian | |
| 2015/0134949 A1* | 5/2015 | Baldwin | H04W 12/02 713/153 |

OTHER PUBLICATIONS

WeVue—Shared Memories Brought to Life; WeVue; http://wevue-production.s3.amazonaws.com/www/site.html; Apr. 23, 2014; downloaded Dec. 15, 2015; 16 pages.

* cited by examiner

*Primary Examiner* — Timothy Pham
(74) *Attorney, Agent, or Firm* — Fitch, Even, Tabin & Flannery LLP

(57) ABSTRACT

Systems and methods for sharing media over a network. The system includes an event server running an event application and configured to store event data and communicate with computing devices over a network. Events are defined based on a geolocation and a time period. Computing devices run a client application configured to send media, geolocations, authentication keys and timestamps over the network. The event server determines whether a computing device matches the event parameters, and if so, associates the computing device with the event. Associated computing devices are then able to access all media associated with the event.

21 Claims, 4 Drawing Sheets

SYSTEMS AND METHODS FOR MEDIA SHARING

BACKGROUND OF THE INVENTION

1. Field of the Invention

The present invention relates generally to sharing of data over a network, and more specifically to sharing of digital media over a network. Even more specifically, the present invention relates to sharing of digital media over a network based on a geographic location.

2. Discussion of the Related Art

Uploading of media and other data from a computing device to a platform for sharing the uploaded media with one or more persons is well known in the art. Smartphones are commonly used for taking photos, images and/or video at events and uploading the media to a cloud-based service or to a social media platform such as Facebook® or Instagram®.

When a user uploads media at an event, the user may provide other people with access to the media by uploading the media to a media-storage service such as Google Photos, and providing other users with an access code or link to view and/or download the media. Alternately, the user may upload and post the photo on a social media application. Selected other users of the application, such as "friends", can then see the media uploaded to the social media application through the user's post on the social media platform. The user may also text or email the media to a person or group of people.

However, the above-mentioned methods require that the user have direct digital contact with the person or persons with whom the media is to be shared. For example, a family may host a birthday party for a child and invite friends and family, but perhaps the family is not on Instagram, and an attendee posts pictures of the party on Instagram. The family would not have direct access to those pictures without requesting that the attendee email the photos or provide the family with a link or other means of accessing the photos.

In some media software applications, an event can be previously defined with location and time parameters. Attendees at the event with smartphones can receive a request to "join" the event when they arrive at the location during the defined time.

Once the attendee joins the event, he can access the media of all others who have joined the same event.

SUMMARY OF THE INVENTION

In one embodiment, the invention can be characterized as a a system for event sharing comprising: an event server including a first processor, a first non-transitory memory, a first communications module, and a server event application configured to run on the first processor; and a computing device including a second processor, a second non-transitory memory, a second communications module, and a client event application configured to run on the second processor, wherein the computing device is configured to determine a current location of the computing device, and wherein the first communications module and the second communications module are configured to exchange data over a network, and wherein the event server is configured to perform the steps of: receiving a first event data from the computing device, the first event data including a plurality of event parameters including at least a geolocation and a time; authenticating the computing device; and determining, based on the at least one first event data parameter, whether the first event data matches one of a plurality of existing events.

In another embodiment, the invention can be characterized as a method for event sharing comprising the steps of: acquiring, by a computing device including a processor, a non-transitory memory, and a client event application configured to run on the processor, of a first event data associated with a first geolocation, and a first time; sending by the computing device of the first event data and the authentication key to an event server communicatively coupled to the computing device through a network, the event server including a processor, a non-transitory memory and a server application configured to run on processor; determining, by the server application, if the computing device is authenticated, upon authentication of the computing device, determining, by the server application, if the first geolocation and the first time are matched by at least one existing event; assigning by the server application of the first event data to one of the at least one existing event, the existing event having at least one existing event data associated with the existing event; and sending by the event server to the computing device an indication of the at least one existing event data.

In a further embodiment, the invention may be characterized as an event server software program product configured to perform the steps of: receiving a first event data from a first computing device with a first geolocation and a first time; assigning the first event data to a first event having a first geofence based on the first geolocation and a first time period based on the first time; receiving a second event data from a second computing device, with a second geolocation and a second time, wherein the second geolocation is within the first geofence and the second time is within the first time period; assigning the second event data to the first event; and allowing the first computing device and the second computing device to access the first event data and the second event data.

BRIEF DESCRIPTION OF THE DRAWINGS

The above and other aspects, features and advantages of several embodiments of the present invention will be more apparent from the following more particular description thereof, presented in conjunction with the following drawings.

Figure 1:
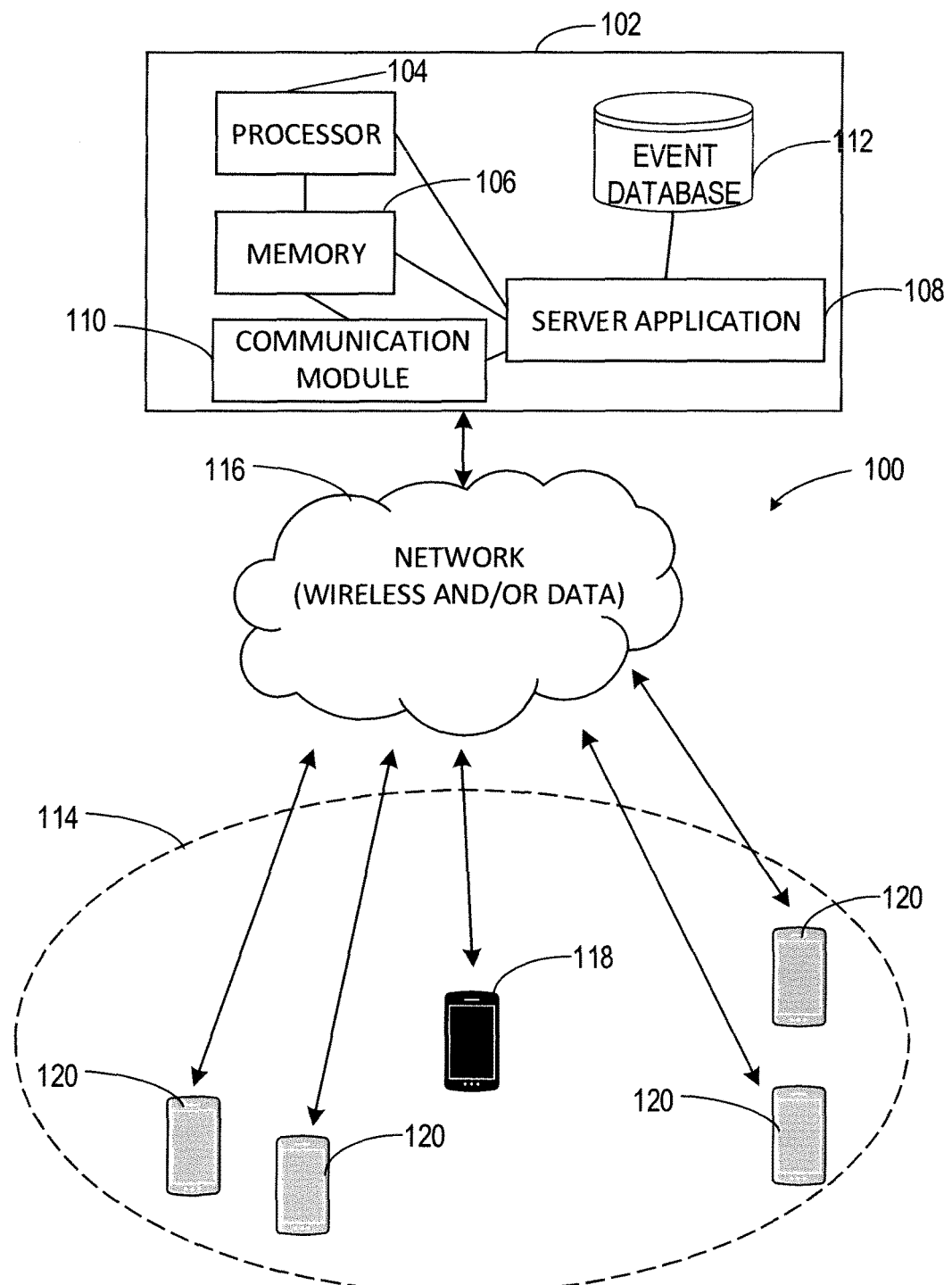
FIG. 1 is a schematic diagram of a system for event sharing is shown in one embodiment of the present invention.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

The following description is not to be taken in a limiting sense, but is made merely for the purpose of describing the general principles of exemplary embodiments. The scope of the invention should be determined with reference to the claims.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

The event sharing system described herein allows for on-the-fly defining of an event, then provides a platform to allow users at the event to automatically have access to media from other users also associated with that event.

Referring first to FIG. 1, a schematic diagram of a system 100 for event sharing is shown in one embodiment of the present invention. The system 100 is shown at a point in time during a time period of an exemplary event. Shown are an event server 102, a server processor 104, a server non-transitory memory 106, an event sharing server application 108, a server communication module 110, an event database 112, a geofence 114, a network 116, a first computing device 118, and a plurality of event computing devices 120.

The event sharing system 100 comprises at least one computing device in communication with the event server 102. The network 116 may be any network configured to transmit data between computing devices and the event server 102, e.g. a cellular network, a wireless internet network, or a wired internet network.

The event server 102 includes the server processor 104, the server non-transitory memory 106, and the event sharing server application 108 configured to run on the server processor 104, the event database 112 and the server communication module 110. The server application 108 is configured to receive and send data through the server communication module 110, store event data on the event database 112, authenticate client computing devices, and manage events and event media data.

The plurality of computing devices 120 may be any type of computing device running a client event application 210 and configured to communicate with the event server 102 through the network 116. In a preferred embodiment, the computing devices 120 are configured to repeatedly obtain a geolocation of the computing device and take photos, video, images, or other media and transmit them and associated metadata through the network 116. The computing devices 120 are typically mobile computing devices such as smartphones or tablets, but in some instances may be desktop computers, smart TVs, or other computing device configured to perform the required computing device functions. The computing devices 120 are described further below in FIG. 2.

In the embodiment of event sharing of the event shown in FIG. 1, the geofence 114 for the event has been established as a radius relative to a geolocation of the first computing device 118. In some embodiments, the geofence 114 may be established by inputting coordinates and the radius (or other dimension establishing a perimeter) into one of the plurality of computing devices 120 or a computing device at a different location. The geofence 114, along with a time period, is used at least in part to define the event. The remainder of computing devices 120 shown are within the geofence 114 at the same time as the first computing device 118, and therefore may potentially be included in the first event established by the first computing device 118. The geofence 114 and the time period of the event are stored on the event server 102 and used to determine whether other computing devices 120 running the client event application 210 may join/be associated with to the event. In the exemplary system 100 shown in FIG. 1, the plurality of computing devices 120 shown are within the geofence 114 during the time period and therefore qualify for being included in the event.

As described further below, once the event is established, when one of the computing devices 120 acquires media during the time period and within the geofence 114 of the event, the client event application 210 participates in an authentication process, in one embodiment including sending an authentication key, a time the media was acquired and a location of the computing device 120 at the time the media was required to the event server 102. The server application 108 authenticates the computing device 120, and upon authentication, determines if the time and location matches an already established event. If the media matches the established event, the server application 108 associates the computing device 120 with the established event, and provides access to the computing device 120 of all media associated with the event. The access may be only during the event time period, or may continue for an amount of time after the event has ended.

Authentication of the computing device 120 may include additional system components configured to authenticate the computing device 120, and may include computing device 120 and/or event server 102 hardware modules and computing device 120 and/or event server 102 software modules. Authentication may also include securing the communication between the event server 102 and the computing device 120. Authentication may include configuring the computing device 120 and/or event server 102 to prevent spoofed geolocation and/or time data from being presented to the event server 102 from a rogue device.

In another embodiment, authentication of the computing device 120 includes taking a photo of the event using the computing device, for example a stage of the event, and sending the photo, the geolocation and time the photo was taken, to the event server 102.

Once the computing device 120 has been associated with the event, all media acquired by the computing device during the time period and within the geofence 114 is also accessible by all other computing devices 120 associated with the event. In this way, each person at an event may automatically gain access to the media acquired by all other persons at the same event.

Figure 2:
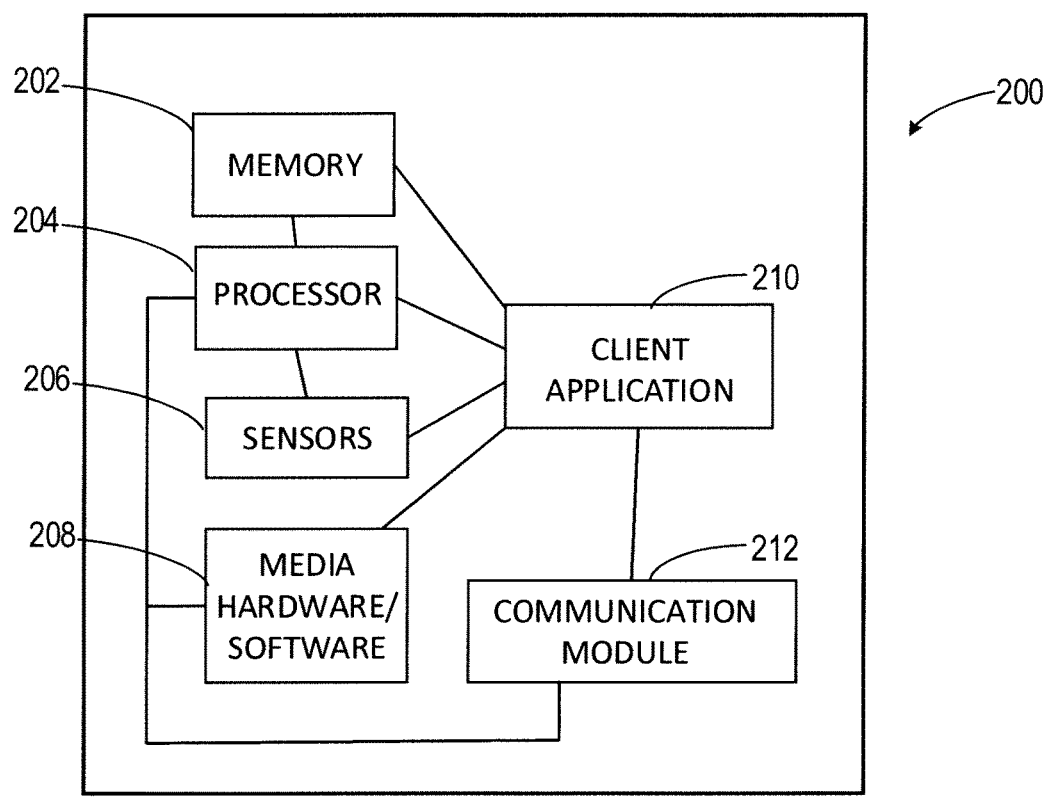
FIG. 2 is a schematic diagram of an exemplary computing device of the event sharing system.

Referring next to FIG. 2, a schematic diagram of an exemplary computing device 200 of the event sharing system 100 is shown. Shown are a device non-transitory memory 202, a device processor 204, at least one device sensor 206, media hardware/software 208, the client application 210, and a device communication module 212.

The computing device, typically a mobile computing device, includes the device processor 204, the device non-transitory memory 202 coupled to the device processor 204, media hardware/software 208 configured to run on the device processor 204, the event sharing client application 210, and the device communication module 212 communicatively coupled to the network 116. In some embodiments the computing device may also include one or more social or media sharing applications, for example Facebook® or Instagram®.

The device communication module 212 is configured to exchange data with the event server 102 over the network 116. The computing device includes hardware for acquiring media, such as a camera for taking still photographs and/or video. The event sharing client application 210 may be configured to directly communicate with the media hardware 208, or may communicate with the hardware 208 through media software 208 or drivers associated with the media hardware 208. In some embodiments, the media may be acquired by the separate social application, and then acquired from the social application by the event sharing client application 210.

The client application 210 is also configured to repeatedly determine the current geolocation of the computing device. This may be done via additional hardware on the computing device, such as a GPS receiver, or may be done with the client application 210 accessing an external location service, such as Google Maps or locations derived from contact with a cellular network.

Additional sensors 206 may be included in the computing device and communicatively coupled to the client application 210, providing additional data that the client application 210 associates with the media data. Data acquired by sensors 206 may include GPS coordinates, nearby WiFi access point names and locations, temperature, barometric pressure, ambient sound level, speed, direction, or other data relating to the time and geolocation of the media.

The event sharing client application 210 also provides a user interface allowing the user to send media and other information to the event server 102, and allow the user to see and in some cases download the other media associated with the event. The client application 210 also allows the user to set various parameters associated with the media sharing, such as media permissions, time period of event, and the size and location of the geofence 114. The event sharing client application 210 is also configured to provide an authentication key or other authentication identification to the event server 102.

Figure 3:
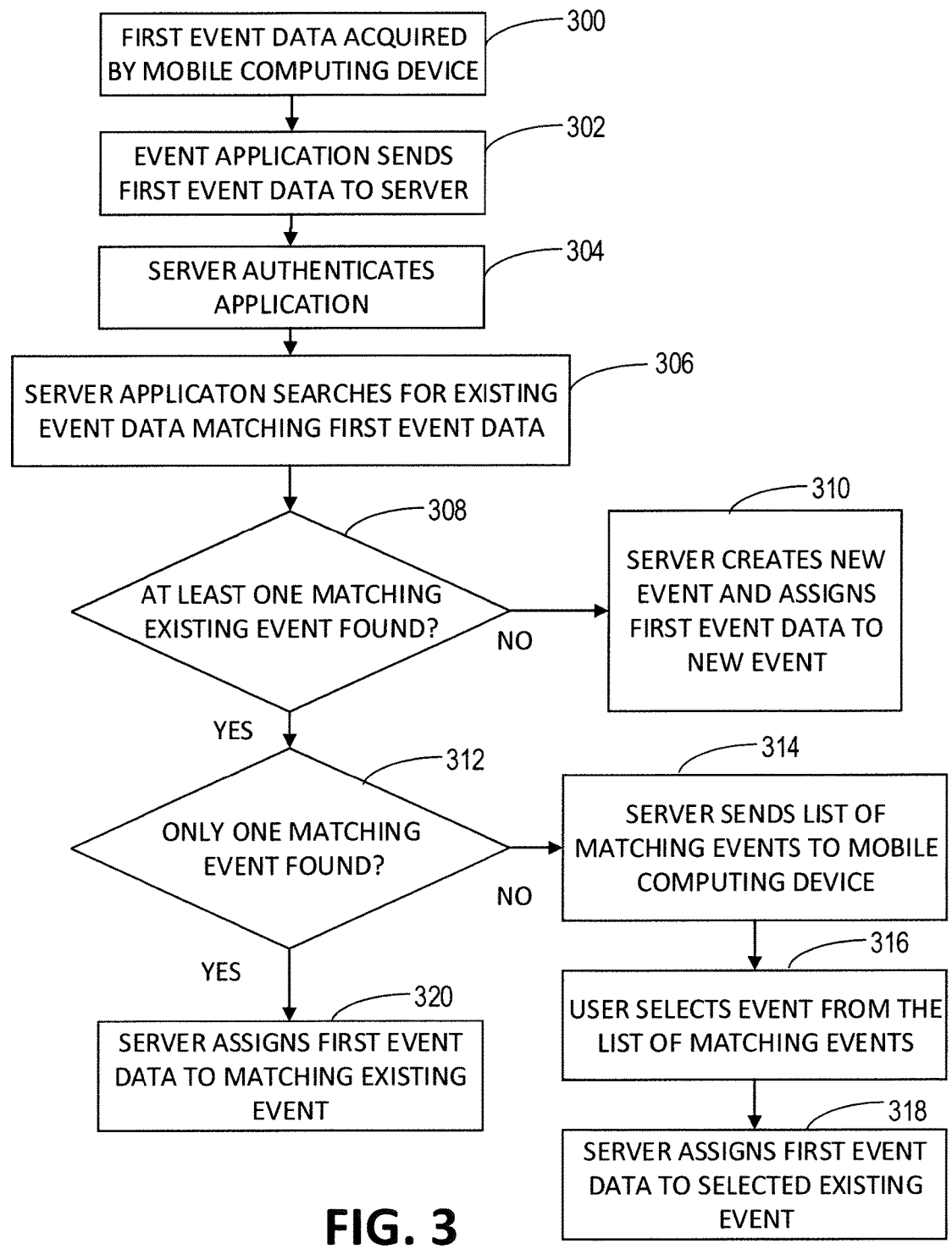
FIG. 3 is a flowchart of a method for sharing event data over the event sharing system.

Referring next to FIG. 3, a flowchart of a method associating a device with an event for sharing event data over the exemplary system 100 is shown. Shown are an acquire first event data step 300, a send data to server step 302, an authenticate step 304, an event search step 306, the at least one matching event decision point 308, the create new event step 310, the only one matching event decision point 312, a send list of matching events step 314, the user selects event step 316, an assign first event data to selected event step 318 and an assign first event data to matching existing event 320.

In the first step, the acquire first event data step 300, the first computing device 118 acquires the first event data, for example a photo with associated metadata, through one of the methods previously described. The event sharing client application 210 receives the data. The event sharing client application 210 also receives data regarding the geolocation of the first computing device 118, and associates the current geolocation with the first event data. The event sharing client application 210 may also receive sensor data from one or more sensors 206 and associate the sensor data with the first event data.

In the second step, the send data to server step 302, the event sharing client application 210 sends the first event data with the associated data (metadata, geolocation and/or sensor data) to the event server 102. The event sharing client application 210 also sends an authentication key to the event server 102.

In the next step, the authenticate step 304, the event server 102 receives the first event data and the authentication key from the first computing device 118 and the server application 108 authenticates the first computing device 118 if the authentication key is correct. The authentication of the first computing device 118 by the event server 102 is critical to avoid data spoofing by unauthorized persons to gain access to events. The method then proceeds to the event search step 306.

During the event search step 306, the server application 108 searches the event database 112 for one or more previously established events that match selected data parameters of the first event data. In a basic case, matching events would have a time period including a timestamp data of the first event data, and have the geofence 114 located around a geolocation of the first event data, i.e. the matching event would be at the same time and same geolocation as the first event data.

In the following step, the at least one matching event decision point 308, if the event sharing server application 108 finds at least one matching event, the method proceeds to the only one matching event decision point 312. If the server application 108 finds no matching events, the method proceeds to the create new event step 310.

In the create new event step 310, when the server application 108 does not find at least one matching event, an indication is sent back to the event sharing client application 210 that no matching event has been found. The user then may then send an indication to the event server 102 for the server application 108 to create a new event based on the first event data parameters or other selected parameters. The new event is then added to the event database 112.

If at least one matching event is found, the process proceeds to the only one matching event decision point 312. If only one matching event is found, the method proceeds to the assign first event data to matching event step 320. In the assign first event data to matching event step 320, the server application 108 associates the first event data with the one matching event. The first event data is now available to other users belonging to the same event.

If a plurality of matching events are found, an indication is sent to the event sharing client application 210 of the plurality of matching events in the send list of matching events step 314. The process then proceeds to the user selects event step 316, where the user chooses which event to associate with the first event data. The event sharing client application 210 then sends an indication back to the event server 102, and the server application 108 associates the first event data with the chosen event in the assign first event data to selected existing event step 318.

Referring again to FIG. 3, a process similar to the method shown can be repeated each time one computing device associated with the event acquires media data through the computing device, with the server application 108 assigning the newly acquired data to the existing event, and then making the data available to the other computing devices 120 belonging to the same event.

In one embodiment, the geofence is defined as a default radius from the geolocation of the first computing device 118. In some embodiments, the start time and the end time of the time period are set to a default time period based on the time of the first event data. In other embodiments, the start and/or end time are based on other parameters, for example, the end time of the event may be determined as no media has been uploaded to the event for 30 minutes.

In some embodiments the event originator can configure additional parameters of the event, e.g. name of the event, description of the event, geofence information, the event duration, the start time, the end time, or a time during which media is available to other users.

In another embodiment, the event can be made a private event, i.e. only available to selected computing devices 120, using a secret code (access token) mechanism, such as, but not limited to, a password, pattern, image, sounds, QR Code, Near Field Communication code, etc., to gain entry to the private event. Computing devices 120 with the access token can then participate in the private event as well as the main event.

In some instances the event can be set up before the time period of the event, with a user using the client application 210 to send the geofence 114 and time period information to the event server 102. In some embodiments, the user can send a list of email addresses or other ways to contact specific users over the network 116 who may be interested in joining the event, and the server application 108 is configured to send the specific users information and/or authentication data allowing one or more of the specific users to join the event prior to an event start time.

While the process described in FIG. 3 begins with the first event data being acquired by the first computing device 118 and then being uploaded to the event server 102, in alternate embodiment the user may define and create an event without uploading media or being at the event time and/or geolocation. The user could create the event using the client application 210, which would send the event parameters to the event server 102. The user could then share the event with other users prior to the beginning of the event, in which case the other users would be associated with the event prior to arrival.

Figure 4:
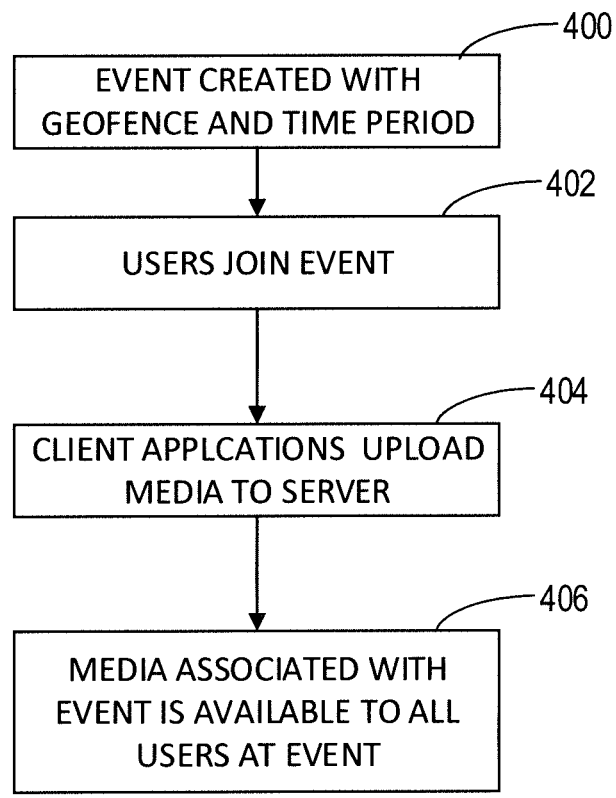
FIG. 4 is a flowchart of a method for sharing event data over the event sharing system.

Referring next to FIG. 4, a flowchart of a general event sharing process using the event sharing system 100 previously disclosed is shown. Shown are a create event step 400, a users join event 402, an upload media step 404, and a media available step 406.

In the create event step 400, the event is created with the geofence 114 and the time period. As previously described, the event may be created prior to the start time of the event, or may be created by a user at the event. The geofence 114 and the time period may be set by the user or may be based on parameters previously stored either by the client application 210 or the server application 108.

In the next users join event step 402, one or more users of the plurality of computing devices 120 join the established event. The users are matched with the event based on at least the geolocation of the computing device 120 and the time, but other data acquired by the computing device 120 (such as from sensors 206) may be used as well. Joining of the user to the event also requires that the computing device 120 be authenticated by the server application 108 to prevent access of the media by unauthorized persons. The users may join the event by uploading media data and being associated with the event, as described in FIG. 3, or may be notified by the server that the geolocation and time of the computing device 120 (and any other required matching parameters) match the existing event. In some embodiments, the user may join the event prior to the start date, as previously described.

In the third upload media step 404, during the time period of the event, users of computing devices 120 associated with the event upload media data to the event server 102 via the client application 210. The server application 108 stores the media data in the event database 112, along with associated metadata. The server application 108 also stores on the event database 112 which users are associated with which events. In practice, thousands or millions of events are stored on the event database 112 and managed by the server application 108, each event with its own set of authorized users and media data.

In the final media available step 406, the server application 108 makes the media data associated with the event available to all computing devices 120 that have joined the event. The media data may be shown to the users via thumbnails on a computing device display, or via a photo feed, or any other method for showing an indication of the media data available. The server application 108 can also allow the users to download all media or selected media from the event.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

While the invention herein disclosed has been described by means of specific embodiments, examples and applications thereof, numerous modifications and variations could be made thereto by those skilled in the art without departing from the scope of the invention set forth in the claims.

What is claimed is:

1. A system for data sharing for data related to an event attended by a plurality of users, comprising:
    an event server including a first processor, a first non-transitory memory, a first communications module, and a server application configured to run on the first processor; and
    a computing device including a second processor, a second non-transitory memory, a second communications module, and a client event application configured to run on the second processor, wherein the computing device is configured to determine a geolocation of the computing device, and wherein the first communications module and the second communications module are configured to exchange data over a network, and wherein the event server is configured to perform the steps of:
    receiving a first event data of the event from the computing device, the first event data including a plurality of first event data parameters including at least a geolocation and a time;
    authenticating the computing device; and
    determining, based on at least the geolocation and the time, whether the first event data matches at least one of a plurality of existing events stored on the event server, wherein each existing event includes existing event data including a geofence and a time period.

2. The system for data sharing of claim 1, further comprising the event server configured to perform the steps of:
    upon determining that the first event data matches one of the plurality of existing events, assigning the first event data to the matched existing event; and
    sending an indication to the computing device of the matched existing event.

3. The system for data sharing of claim 1, further comprising the event server configured to perform the steps of:
    upon determining that the first event data matches one of the plurality of existing events, assigning the first event data to the matched existing event; and
    selecting at least one existing event data of the matched existing event; and
    sending an indication to the computing device for each at least one existing event data.

4. The system for data sharing of claim 1, further comprising the event server configured to perform the step of:
    upon determining that the first event data matches more than one of the plurality of existing events, sending an indication to the computing device of the plurality of existing events matching the first event data.

5. The system for data sharing of claim 4, further comprising the event server configured to perform the steps of:
    receiving an indication from the computing device of a selected existing event selected from the plurality of existing events matching the first event data; and
    associating the first event data with the selected existing event.

6. The system for data sharing of claim 1, the first event data parameters based on at least a geofence and a time period.

7. The system for data sharing of claim 6, the at least one first event data parameter based on data from at least one sensor of the computing device.

8. The system for data sharing of claim 1, authenticating including taking of a photo at the event using the computing device, the photo associated with a geolocation and a time, and sending by the computing device of the photo, the geolocation, and the time to the event server.

9. A method for data sharing for data related to an event attended by a plurality of users, comprising the steps of:
    acquiring, by a computing device including a first processor, a first non-transitory memory, and a client event application configured to run on the first processor, of a first event data including a first geolocation and a first time;
    sending by the computing device of the first event data and an authentication key to an event server communicatively coupled to the computing device through a network, the event server including a second processor, a second non-transitory memory and a server application configured to run on the second processor;
    determining, by the server application, if the computing device is authenticated;
    upon authentication of the computing device, determining, by the server application, if the first geolocation and the first time are matched by at least one of a plurality of existing events stored on the event server, wherein each existing event includes existing event data including a geofence and a time period;
    upon determining that the first event data matches at least one existing event, assigning by the server application of the first event data to one of the at least one matched existing event; and
    sending by the event server to the computing device an indication of at least one existing event data of the at least one matched existing event.

10. The method for data sharing of claim 9, wherein the at least one matched existing event is at least two matched existing events, and further comprising the step of sending to the computing device, by the event server, an indication of the at least two matched existing events.

11. The method for data sharing of claim 10, wherein one of the at least two matched existing events is selected by a user of the computing device, whereby the first event data is assigned to the selected matched existing event.

12. The method for data sharing of claim 9, wherein matching of the first event data to the at least one of the plurality of existing events includes the first geolocation being bounded in a geofence of the at least one matched existing event and the first time being within a time period of the at least one matched existing event.

13. The method for data sharing of claim 9, further comprising at least one metadata associated with the first event data.

14. The method for data sharing of claim 13, the metadata including at least one of sensor data from at least one sensor of the computing device.

15. The method for data sharing of claim 14, wherein the at least one sensor is configured to determine at least one of a temperature, a WiFi access point name, a WiFi access point location, a barometric pressure, an ambient sound level, a speed, and a direction.

16. The method for data sharing of claim 9, wherein the first event data and the existing event data include at least one of a photo and a video.

17. A computer-readable non-transitory medium encoded with an event server software program product configured to perform the steps of:
    receiving a first event data from a first computing device with a first geolocation and a first time;
    storing the first event data;
    assigning the first event data to a first event having a first geofence based on the first geolocation and a first time period based on the first time;

receiving a second event data from a second computing device with a second geolocation and a second time, wherein the second geolocation is within the first geofence and the second time is within the first time period;

storing the second event data;

assigning the second event data to the first event; and allowing the first computing device and the second computing device to access the first event data and the second event data.

18. The computer-readable non-transitory medium encoded with the event server software program product of claim 17, further comprising the steps of:

authenticating the first computing device prior to assigning the first event data to the first event; and authenticating the second computing device prior to assigning the second event data to the first event.

19. The computer-readable non-transitory medium encoded with the event server software program product of claim 17, wherein the first event data and the second event data include at least one of a photo and a video.

20. The computer-readable non-transitory medium encoded with the event server software program product of claim 17, wherein the first event data and the second event data include metadata.

21. A system for data sharing for data related to an event attended by a plurality of users, comprising:

an event server including a first processor, a first non-transitory memory, a first communications module, and a server application configured to run on the first processor; and a computing device including a second processor, a second non-transitory memory, a second communications module, and a client event application configured to run on the second processor, wherein the computing device is configured to determine a current location of the computing device, and wherein the first communications module and the second communications module are configured to exchange data over a network, and wherein the event server is configured to perform the steps of:

receiving an access token from the computing device;

upon determining that the access token received from the computing device matches an event access token associated with the event, granting the computing device access to event data stored on the event server and associated with the event, the event data including at least a geofence and a time period.

* * * * *

UNITED STATES PATENT AND TRADEMARK OFFICE
CERTIFICATE OF CORRECTION

PATENT NO. : 9,743,248 B2
APPLICATION NO. : 14/938747
DATED : August 22, 2017
INVENTOR(S) : Venkatesan et al.

Page 1 of 1

It is certified that error appears in the above-identified patent and that said Letters Patent is hereby corrected as shown below:

In the Claims

Claim 7, Column 9, Line 60, before "at" delete "the".

Signed and Sealed this
Nineteenth Day of December, 2017

Joseph Matal
*Performing the Functions and Duties of the*
*Under Secretary of Commerce for Intellectual Property and*
*Director of the United States Patent and Trademark Office*